(12) United States Patent
Wu

(10) Patent No.: US 9,292,055 B2
(45) Date of Patent: Mar. 22, 2016

(54) PERIPHERAL COMPONENT INTERCONNECT EXPRESS SLOT EXPANSION SYSTEM

(71) Applicant: IOI Technology Corporation, New Taipei (TW)

(72) Inventor: Hua-Kang Wu, New Taipei (TW)

(73) Assignee: IOI Technology Corporation, New Taipei (TW)

( * ) Notice: Subject to any disclaimer, the term of this patent is extended or adjusted under 35 U.S.C. 154(b) by 303 days.

(21) Appl. No.: 14/138,117

(22) Filed: Dec. 22, 2013

(65) Prior Publication Data

US 2015/0003004 A1   Jan. 1, 2015

(30) Foreign Application Priority Data

Jun. 26, 2013   (TW) .............................. 102211985 U

(51) Int. Cl.
  *G06F 1/18*   (2006.01)
(52) U.S. Cl.
  CPC ................ *G06F 1/188* (2013.01); *G06F 1/185* (2013.01); *G06F 2213/0026* (2013.01)
(58) Field of Classification Search
  CPC ....... G06F 13/409; G06F 1/185; G06F 1/186; G06F 2213/0024; G06F 2213/0026
  USPC ...................... 361/679.41; 710/301, 303, 304
  See application file for complete search history.

(56) References Cited

U.S. PATENT DOCUMENTS

| | | |
|---|---|---|
| 8,347,013 B2 | 1/2013 | Shen |
| 8,363,394 B2 | 1/2013 | Chen et al. |
| 8,585,442 B2 | 11/2013 | Tuma et al. |
| 8,625,303 B2 * | 1/2014 | Yin .......................... G06F 1/185 631/679.31 |
| 2003/0123220 A1 | 7/2003 | Huang |
| 2008/0244141 A1 | 10/2008 | Babin |
| 2012/0033370 A1 | 2/2012 | Reinke et al. |
| 2012/0246373 A1 | 9/2012 | Chang |
| 2013/0238828 A1 | 9/2013 | Heng-Sheng Lin |
| 2015/0212961 A1 * | 7/2015 | Wu ........................ G06F 13/385 710/313 |

FOREIGN PATENT DOCUMENTS

CN   202383668 U   8/2012

OTHER PUBLICATIONS

ATX Specification.
Cabled PCI Express—Implementation Considerations.
PCI Express Cabling.
PCI Express® 1.1 Mechanical Form Factors.
USB 3.0 Internal Connector and Cable Specification.

* cited by examiner

*Primary Examiner* — Adrian S Wilson
(74) *Attorney, Agent, or Firm* — CKC & Partners Co., Ltd.

(57) ABSTRACT

A Peripheral Component Interconnect Express (PCIe) slot expansion system includes a cable adapter, at least one card docking station, and a plurality of standard USB3.0 2-in-1 internal cables. The cable adapter includes a plurality of first PCIe connecting ports and a PCIe male connector, the PCIe male connector is configured to be inserted into a first PCIe slot of a mother board. The card docking station has a width of 5.25 inch. Each card docking station includes: one or two power input port; one or two second PCIe connecting port; and at least one PCI slot or second PCIe slot. Each standard USB3.0 2-in-1 internal cable has a first cable connector and a second cable connector at two opposite ends to be connected with the first connecting port and the second PCIe connecting port respectively.

12 Claims, 5 Drawing Sheets

PERIPHERAL COMPONENT INTERCONNECT EXPRESS SLOT EXPANSION SYSTEM

RELATED APPLICATIONS

This application claims priority to Taiwan Application Serial Number 102211985, filed Jun. 26, 2013, which is herein incorporated by reference.

BACKGROUND

1. Field of Invention

The present invention relates to a Peripheral Component Interconnect Express (PCIe) slot expansion system.

2. Description of Related Art

In the ever-changing computer era, software and hardware are fast updating in performance and application. Personal computer module and system are thus being developed, along with a wide variety of adapters and device cards, such as display cards, video capture cards, TV tuner cards, data acquisition cards, RAID cards, and other features of computing cards. These adapters and devices normally need to be installed at the same time in a host computer so as to expand their capabilities and operate cooperatively.

Peripheral Component Interconnect Express (PCIe) slot is limited by number in a standard case of personal computer, and it is often not enough for users requiring several PCIe or PCI add-in cards. Particularly when an industrial computer is doing host-centric fan-out applications, more PCIe or PCI slots are in demand.

SUMMARY

An aspect of the present invention is to provide a Peripheral Component Interconnect Express (PCIe) slot expansion system.

According to an embodiment of the present invention, A Peripheral Component Interconnect Express (PCIe) slot expansion system includes a cable adapter, at least one card docking station, and a plurality of standard USB3.0 2-in-1 internal cables. The cable adapter includes a plurality of first PCIe connecting ports and a PCIe male connector, the PCIe male connector is configured to be inserted into a first PCIe slot of a mother board. The card docking station has a width of 5.25 inch. Each card docking station includes: one or two power input port; one or two second PCIe connecting port; and at least one PCI slot or second PCIe slot. Each standard USB3.0 2-in-1 internal cable has a first cable connector and a second cable connector at two opposite ends to be connected with the first PCIe connecting port and the second PCIe connecting port respectively.

In an embodiment of the present invention, the card docking station has a similar dimension of a 5.25 inch standard Optical Disk Drive (ODD), and is installed into the 5.25 inch standard docking bay of a computer case.

In an embodiment of the present invention, the height of the card docking station is less than 5 cm.

In an embodiment of the present invention, the card docking station has a height more than 5 cm and less than 10 cm.

In an embodiment of the present invention, the PCI slot or the second PCIe slot has a quantity of one or two.

In an embodiment of the present invention, the PCI slot or the second PCIe slot has a quantity of three or four.

In an embodiment of the present invention, the second PCIe slot is a PCIe x1, PCIe x4, PCIe x8 or PCIe x16.

In an embodiment of the present invention, each first PCIe connecting port or second PCIe connecting port is compatible to USB3.0 2-in-1 19 pin internal connector.

In an embodiment of the present invention, the first PCIe connecting port of the cable adapter has a quantity of one, two or four.

In an embodiment of the present invention, the power input port is connected with a Serial Advanced Technology Attachment (SATA) power output port.

In an embodiment of the present invention, the PCIe male connector of the cable adapter is a PCIe x1, PCIe x4, PCIe x8, or PCIe x16 add-in card edge-finger.

In an embodiment of the present invention, the cable adapter, the card docking station, and each standard USB3.0 2-in-1 internal cable are installed in a computer case.

In an embodiment of the present invention, the specification of the cable adapter is 1-lane, 2-lane, 4-lane or 8-lane.

The PCIe slot expansion system of this invention allows consumers to choose different card docking station freely, to expand multiple PCI or PCIe slots. Therefore, consumers can mix and match different kinds of card docking stations conveniently. The card docking station is installed into 5.25 inch standard docking bays in a computer case easily. The power supply of the card docking station is from power supply of the computer. Without required to purchase an extra power supply, the expenditure of consumer is saved. This format of standard USB3.0 2-in-1 internal cable is high in speed and affordable for anyone, thus, consumer does not need to spend too much for it, while benefiting from the PCIe slot expansion system.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
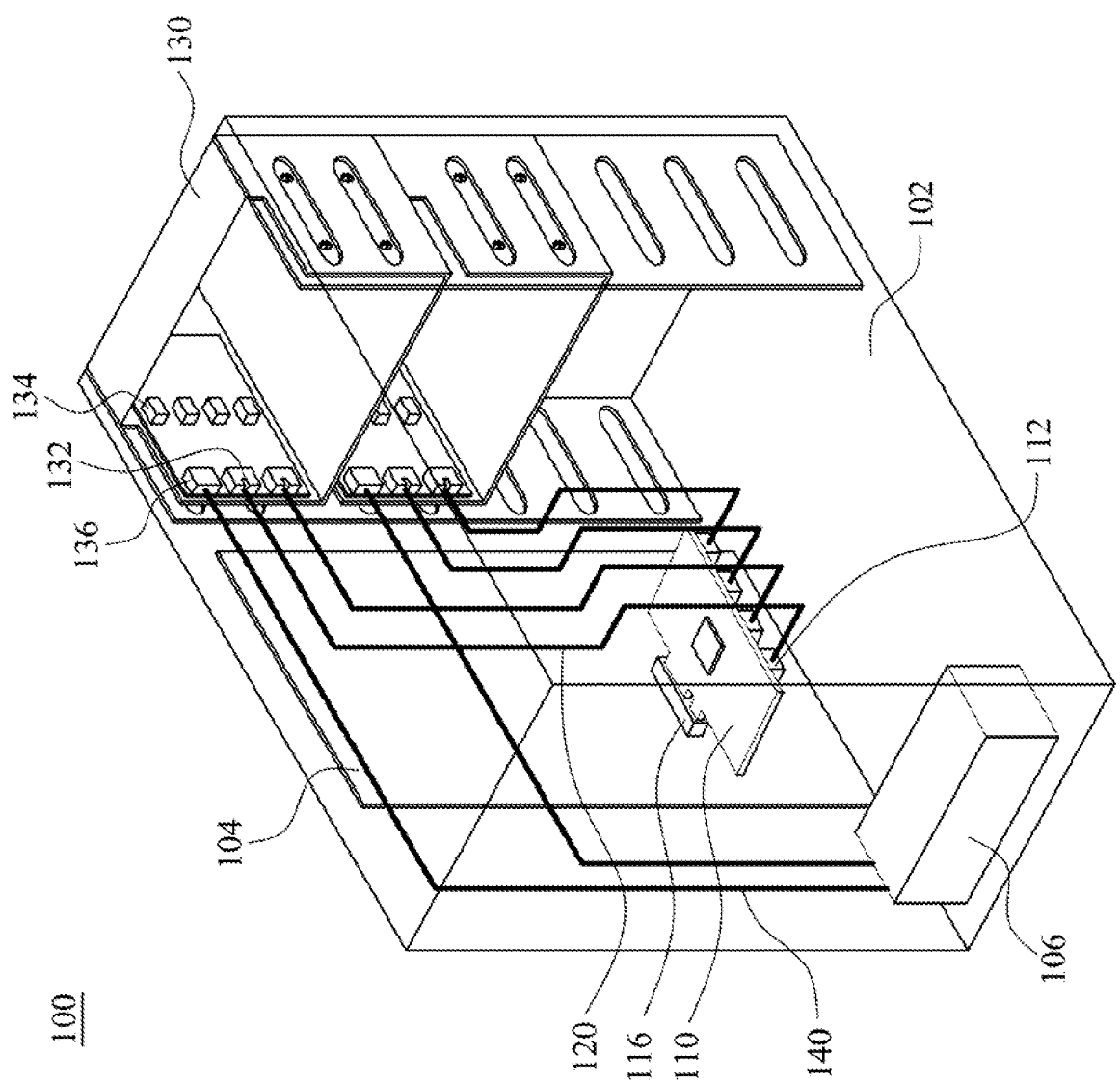
FIG. 1 illustrates a perspective view of a computer equipped with a PCIe slot expansion system.

FIG. 1 illustrates a perspective view of a computer equipped with a PCIe slot expansion system. The PCIe slot expansion system 100 includes a cable adapter 110, at least one card docking station 130, and a plurality of standard USB3.0 2-in-1 internal cables 120. The cable adapter 110 is connected with the card docking station 130 through the standard USB3.0 2-in-1 internal cables 120. The cable adapter 110 is connected with a first PCIe slot 116 on a mother board 104 fixed on one side of a computer case 102. One end of the standard USB3.0 2-in-1 internal cables 120 is connected with the cable adapter 110, while the other end is connected with the card docking station 130. The cable connector of an end to the standard USB3.0 2-in-1 internal cable 120 is connected with the second PCIe connecting port 132 of the card docking station 130. The card docking station 130 is installed in 5.25 inch docking bay of a computer case 102. The card docking station 130 includes a power input port 136, connected with a power cable 140 from power supply 106 of the computer case 102. The port of the power cable 140 (see FIG. 1) and each power input port 136 is a Serial Advanced Technology Attachment (SATA) power output port. The Serial Advanced Technology Attachment (SATA) power output port supplies 3 kinds of power, those are 12V, 5V, and 3.3V. The second PCIe slot 134 of the invention requires 3 kinds of powers; those are 12V, 3.3V, and 3.3 Vaux. The PCI slot 134" (see FIG. 5) requires 4 kinds of power; those are 12V, 5V, 3.3V, and −12V. The 12V, 5V, and 3.3V powers are generated by the power supply 106 and are transmitted into Serial Advanced Technology Attachment (SATA) power connector through the power cable 140. The −12V power is converted by 12V. The first PCIe slot 116 supplies the 3.3 Vaux to the second PCIe slot 134, sequentially through the cable adapter 110 and the standard USB3.0 2-in-1 internal cable 120. Thus, the second PCIe slot 134 is able to provide sufficient power for add-in cards to perform function.

Figure 2:
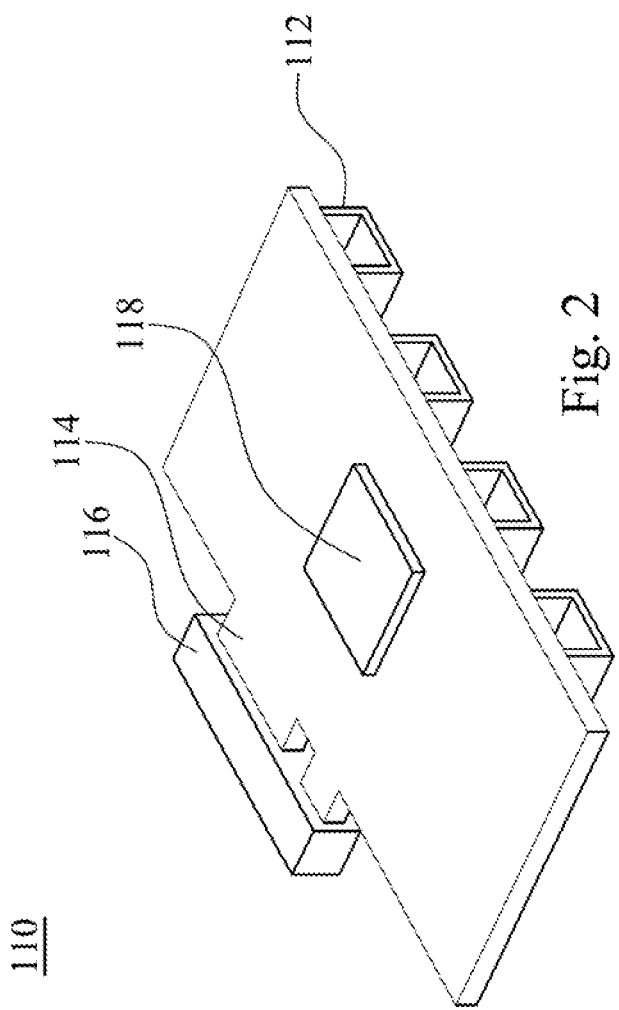
FIG. 2 illustrates a cable adapter used in this invention.

FIG. 2 illustrates a cable adapter used in this invention. The cable adapter 110 includes a plurality of first PCIe connecting ports 112, a chip 118, and a PCIe male connector 114. The PCIe male connector 114 is add-in card edge-finger. The cable adapter 110 configured to be inserted into a first PCIe slot 116 on the mother board 104 (see FIG. 1) by the PCIe male connector 114. The chip 118 is used to process digital information. The digital information is transferred from the PCIe male connector 114 to the first PCIe connecting port 112. The first PCIe connecting port 112 is compatible to USB3.0 2-in-1 19 pin internal connector. The first PCIe connecting port 112 of the cable adapter 110 have a quantity of one, two or four. A specification of the cable adapter 110 is 1-lane, 2-lane, 4-lane or 8-lane. To be more specific, the specification of the cable adapter with one first PCIe connecting port is 1-lane or 2-lane. The specification of the cable adapter with two first PCIe connecting ports is 4-lane. The specification of the cable adapter with four first PCIe connecting ports is 8-lane.

Figure 3:
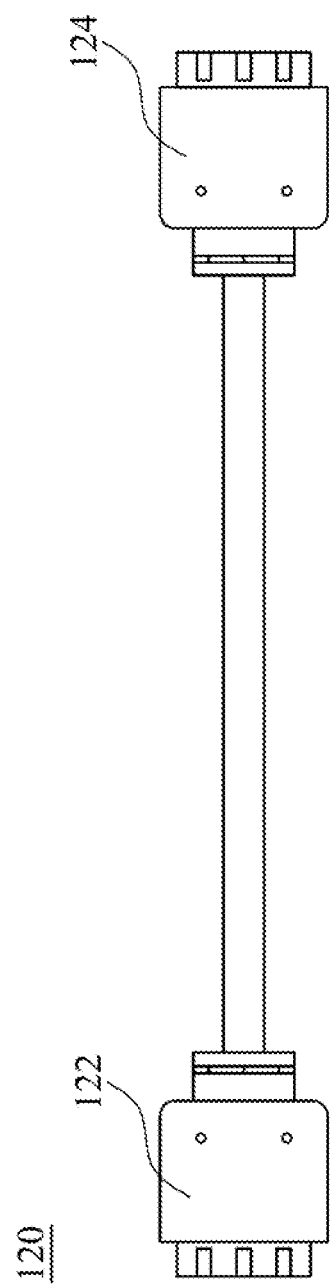
FIG. 3 illustrates a standard USB3.0 2-in-1 internal cable used in this invention.

FIG. 3 illustrates a standard USB3.0 2-in-1 internal cable used in this invention. The format of standard USB3.0 2-in-1 internal cables 120 are speedy and cheap, and is accepted by consumers. A plurality of standard USB3.0 2-in-1 internal cables each having a first cable connector 122 and a second cable connector 124 at two opposite ends to be connected with the first PCIe connecting port 112 (see FIG. 2) and the second PCIe connecting port 132 (see FIG. 4) respectively. The digital information transfers through the first cable connector 122 connected with the first PCIe connecting port 112 (see FIG. 1) to the second cable connector 124 connected with the second PCIe connecting port 132, thus, the cable adapter 110 (see FIG. 2) and the card docking station 130 (see FIG. 1) are electrically connected with each other by the standard USB3.0 2-in-1 internal cables 120.

Figure 4:
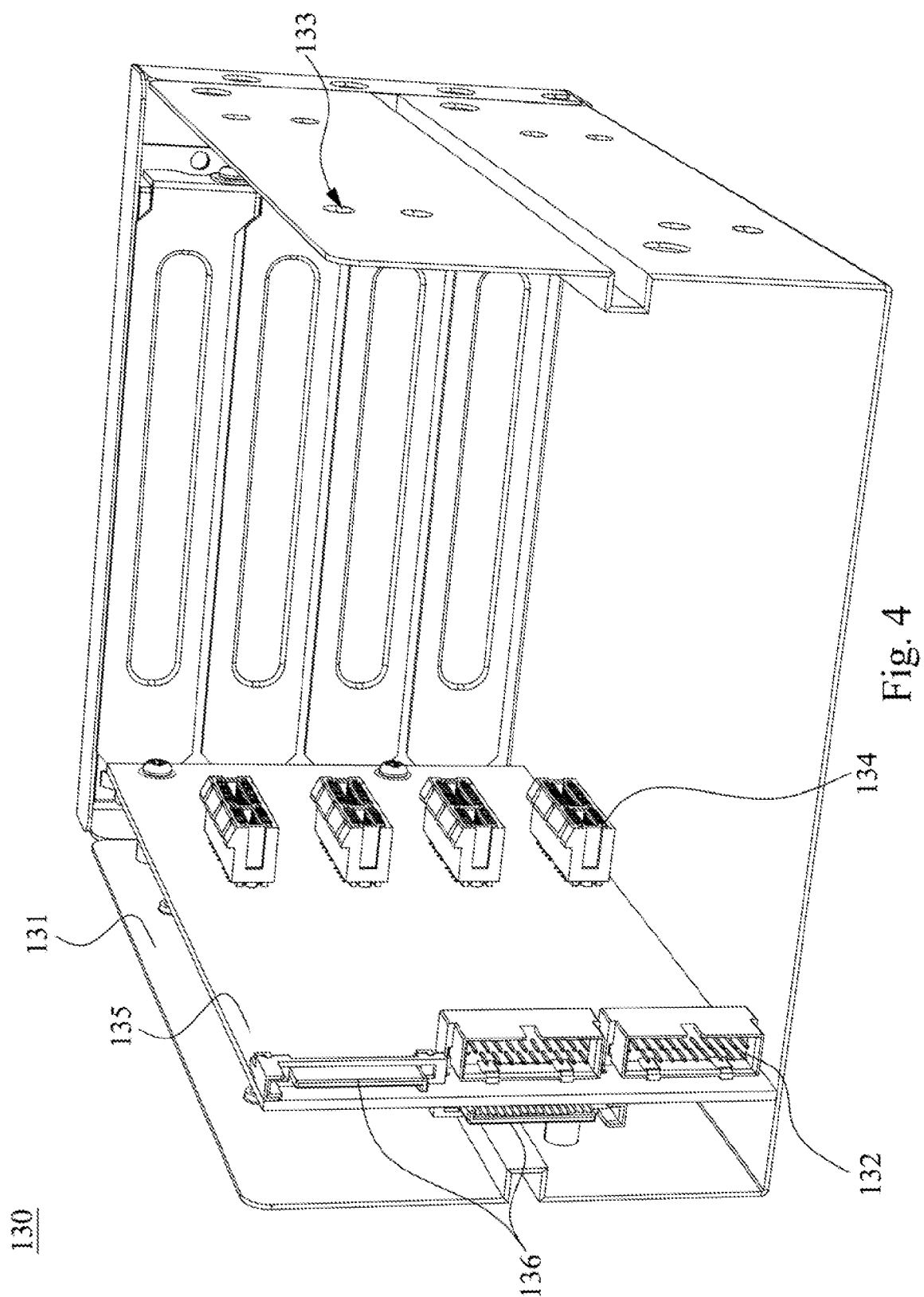
FIG. 4 illustrates a PCIe card docking station according to one embodiment of this invention.

FIG. 4 illustrates a PCIe card docking station according to one embodiment of this invention. The card docking station 130 includes two power input ports 136, two second PCIe connecting ports 132, and four second PCIe slot 134. The second PCIe connecting port 132 is compatible to USB3.0 2-in-1 19 pin internal connector. The second cable connector 124 (see FIG. 3) connected with the second PCIe connecting port 132 transfers the digital information to the second PCIe slot 134 through a circuit board 135.

The card docking station 130 is 5.25 inch width, and the height is between 5 and 10 centimeters, therefore, it can be installed into two 5.25 inch standard docking bay of a computer case 102 (see FIG. 1). Each power input port 136 of the card docking station 130 is connected with the power cable 140 from power supply 106 (see FIG. 1). The port of the power cable 140 (see FIG. 1) and each power input port 136 is a Serial Advanced Technology Attachment (SATA) power output port. Therefore consumers are not required to connect with a power supply externally. The card docking station 130 provides four second PCIe slots 134. The second PCIe slot 134 is a PCIe x1, PCIe x4, PCIe x8, PCIe x16, or PCI slot attached on the circuit board 135. The circuit board 135 is installed on one side of a shell 131. The second PCIe slot 134 is parallel to the first PCIe slot 116 (see FIG. 1). One embodiment of the PCIe slot expansion system 100 includes two card docking station 130. Therefore, the PCIe slot expansion system 100 expands up to eight second PCIe slots 134. The card docking station 130 includes a plurality of holes 133 by two sides of the shell 131, and is installed into 5.25 inch standard docking bays of a computer case 102 (see FIG. 1) with the holes 133.

Figure 5:
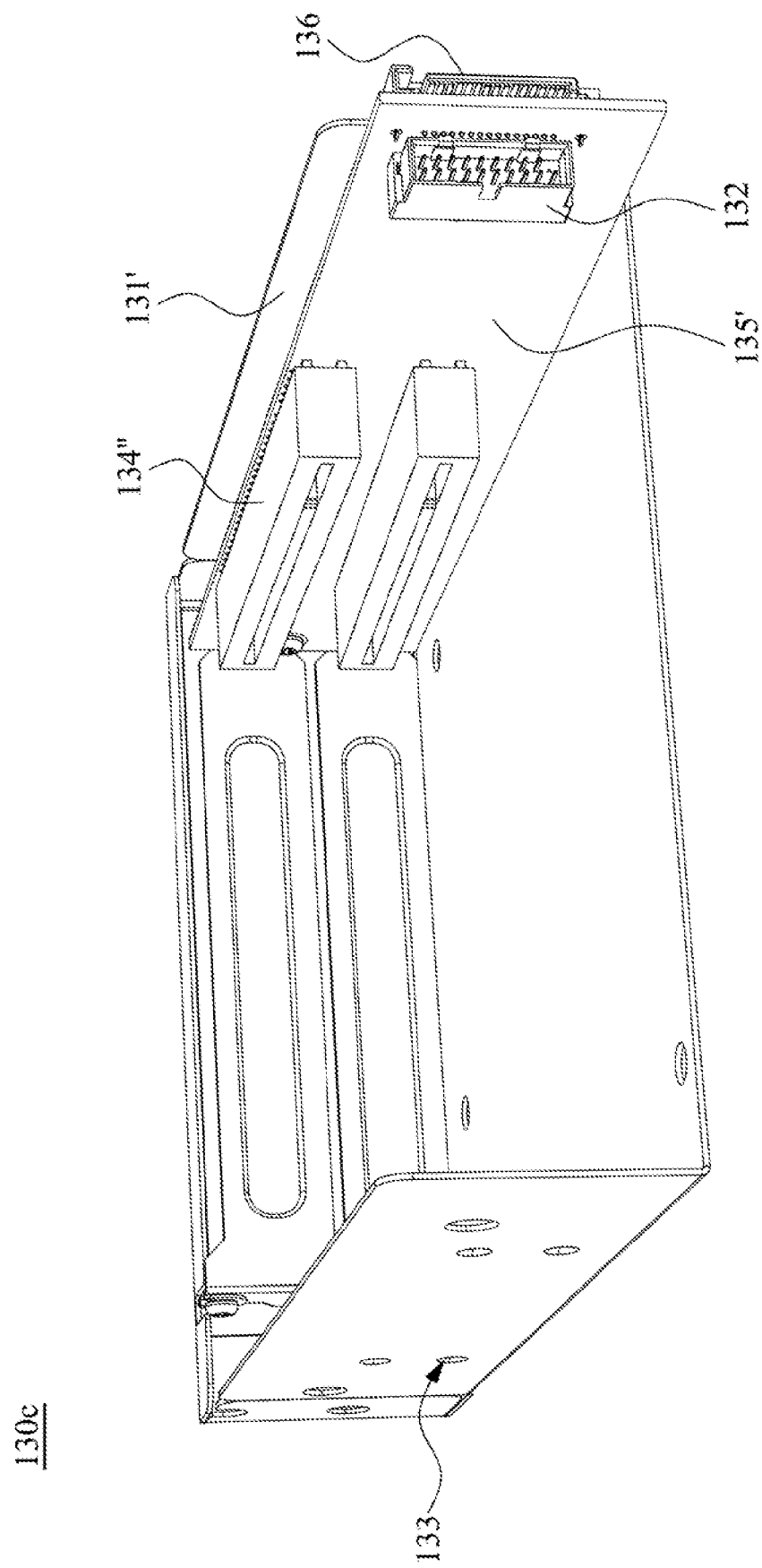
FIG. 5 illustrates a PCI card docking station according to one embodiment of this invention.

FIG. 5 illustrates a PCI card docking station according to one embodiment of this invention. The card docking station 130c is 5.25 inch width, and the height is less than 5 centimeters, thus, it can be installed into one 5.25 inch standard docking bay of a computer case 102 (see FIG. 1). The power input port 136 of the card docking station 130c is connected with the power cable 140 from power supply 106. The port of the power cable 140 is a Serial Advanced Technology Attachment (SATA) power output port. Therefore consumers do not need to connect with a power supply from outside of a computer. The card docking station 130c provides two PCI slots 134". The second PCIe slots 134" are PCIe x1, PCIe x4 or PCI slots fixed on a circuit board 135'. The circuit board 135' is installed on one side of the shell 131'. The PCI slot 134" is parallel to the first PCIe slot 116 (see FIG. 1). One embodiment of the PCIe slot expansion system 100 includes four card docking stations 130c. Therefore, the PCIe slot expansion system 100 can expand up to eight PCI slots 134". The card docking station 130c includes a plurality of holes 133 by two sides of the shell 131', and is installed into 5.25 inch standard docking bay of a computer case 102 (see FIG. 1) with the holes 133.

Figure 6:
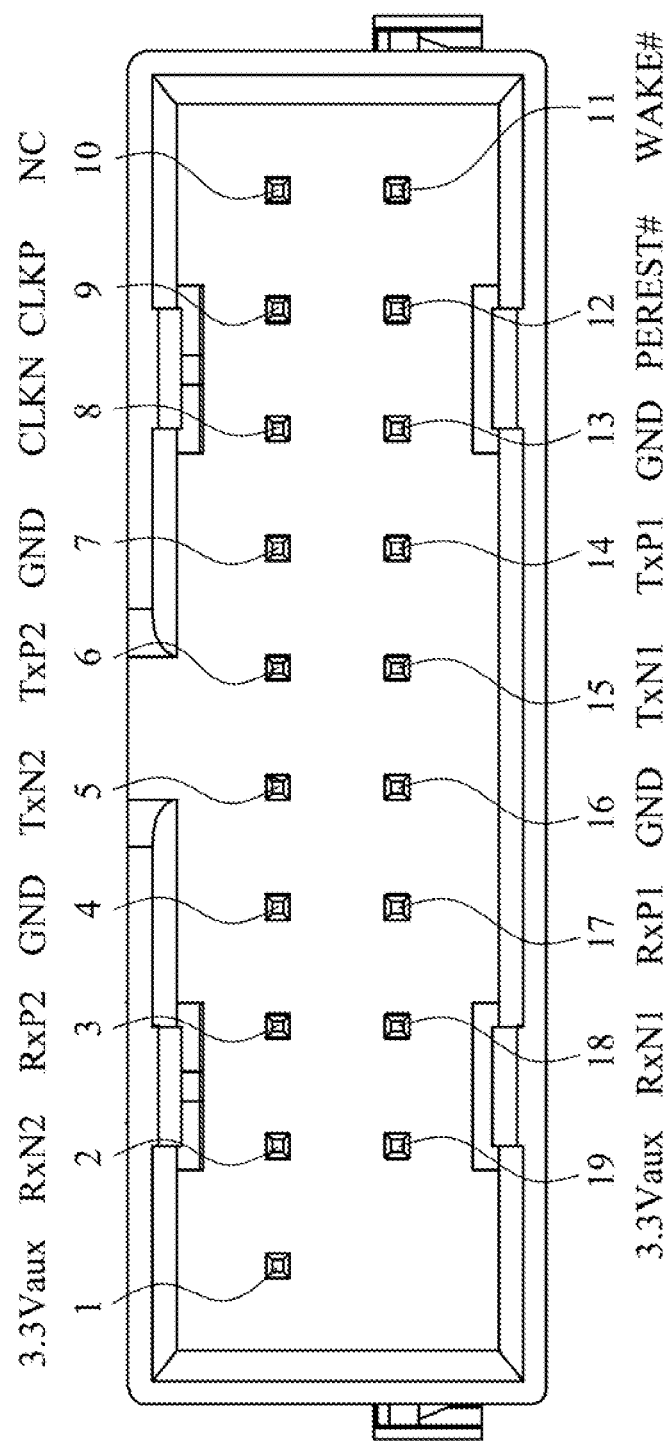
FIG. 6 illustrates a front view of a PCIe connecting port used in this invention.

FIG. 6 illustrates a front view of a PCIe connecting port used in this invention. In this invention, the specification of the first PCIe connecting port 112 is the same in the specification as the second PCIe connecting port 132. Thus, in the following description, a PCIe connecting port is used to represent the first PCIe connecting port 112 or the second PCIe connecting port 132. A reason that the invention adopts the standard USB3.0 2-in-1 internal cables 120 is that the standard USB3.0 2-in-1 internal cables 120 have no metal shield, so that avoids short-circuit problems. The standard USB3.0 2-in-1 internal cables 120 is also excellent in magnetic shielding, therefore, it is stable in transmitting within a case 102 (see FIG. 1). The standard USB3.0 2-in-1 internal cable 120 is high in speed and affordable for anyone, thus, consumer does not need to spend too much for it, while benefiting from the PCIe slot expansion system. Accordingly, the invention adopts the standard USB3.0 2-in-1 internal cables 120 and specially designed the PCIe connecting port, the definition to each pin of the PCIe connecting port is listed on the table below:

| Pin | Symbol | Description |
| --- | --- | --- |
| 1 | 3.3Vaux | 3.3 V Auxiliary |
| 2 | RxN2 | Differential PCI Express Receiver Lane 2 |
| 3 | RxP2 | Differential PCI Express Receiver Lane 2 |
| 4 | GND | Ground |
| 5 | TxN2 | Differential PCI Express Transmitter Lane 2 |
| 6 | TxP2 | Differential PCI Express Transmitter Lane 2 |
| 7 | GND | Ground |
| 8 | CLKN | Differential 100 MHz Cable Reference Clock |
| 9 | CLKP | Differential 100 MHz Cable Reference Clock |
| 10 | NC | No connection |
| 11 | WAKE# | Power Management Signal for Wakeup Events |
| 12 | PERST# | PCI Express Fundamental Reset |
| 13 | GND | Ground |
| 14 | TxP1 | Differential PCI Express Transmitter Lane |
| 15 | TxN1 | Differential PCI Express Transmitter Lane |
| 16 | GND | Ground |
| 17 | RxP1 | Differential PCI Express Receiver Lane 1 |
| 18 | RxN1 | Differential PCI Express Receiver Lane 1 |
| 19 | 3.3Vaux | 3.3 V Auxiliary |

The PCIe connecting port of the invention is designed according to the definition of the pin on the table above, and the PCIe connecting port performs well in a functional test.

The PCIe slot expansion system of this invention allows consumers to choose different card docking station freely, to expand multiple PCI or PCIe slots. Therefore, consumers can mix and match different kinds of card docking stations conveniently. The card docking station is installed into 5.25 inch standard docking bays in a computer case easily. The power supply of the card docking station is from the SATA power cable of the computer power supply. Without required to purchase an extra power supply, the expenditure of consumer is saved. This format of standard USB3.0 2-in-1 internal cable is high in speed and affordable for anyone, thus, consumer does not need to spend too much for it, while benefiting from the PCIe slot expansion system.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A Peripheral Component Interconnect Express (PCIe) slot expansion system comprising:

a cable adapter including a plurality of first PCIe connecting ports and a PCIe male connector, the PCIe male connector being configured to be inserted into a first PCIe slot of a mother board;

at least one card docking station having a width of 5.25 inch, each card docking station including one or two power input port, one or two second PCIe connecting port and at least one PCI slot or second PCIe slot; and a plurality of standard USB3.0 2-in-1 internal cables each having a first cable connector and a second cable connector at two opposite ends to be connected with the first PCIe connecting port and the second PCIe connecting port respectively.

2. The PCIe slot expansion system of claim 1, wherein the card docking station has a similar dimension of a 5.25 inch standard Optical Disk Drive (ODD), and is installed into the 5.25 inch standard docking bay of a computer case.

3. The PCIe slot expansion system of claim 1, wherein the card docking station has a height less than 5 cm.

4. The PCIe slot expansion system of claim 1, wherein the card docking station has a height more than 5 cm and less than 10 cm.

5. The PCIe slot expansion system of claim 1, wherein the PCI slots or the second PCIe slots have a quantity of one, two, three or four.

6. The PCIe slot expansion system of claim 1, wherein the second PCIe slot is a PCIe x1, PCIe x4, PCIe x8 or PCIe x16 slot.

7. The PCIe slot expansion system of claim 1, wherein each first PCIe connecting port or second PCIe connecting port is compatible to USB3.0 2-in-1 19 pin internal connector.

8. The PCIe slot expansion system of claim 1, wherein the first PCIe connecting port of the cable adapter has a quantity of one, two or four.

9. The PCIe slot expansion system of claim 1, wherein the first PCIe slot supplies the 3.3 Vaux to the second PCIe slot, sequentially through the cable adapter and the standard USB3.0 2-in-1 internal cable, whereby the second PCIe slot is able to provide sufficient power for add-in cards to perform function.

10. The PCIe slot expansion system of claim 1, wherein the power input port is connected with a Serial Advanced Technology Attachment (SATA) power output port.

11. The PCIe slot expansion system of claim 1, wherein the PCIe male connector of the cable adapter is a PCIe x1, PCIe x4, PCIe x8, or PCIe x16 add-in card edge-finger.

12. The PCIe slot expansion system of claim 1, wherein a specification of the cable adapter is 1-lane, 2-lane, 4-lane or 8-lane.

* * * * *